UNITED STATES PATENT OFFICE.

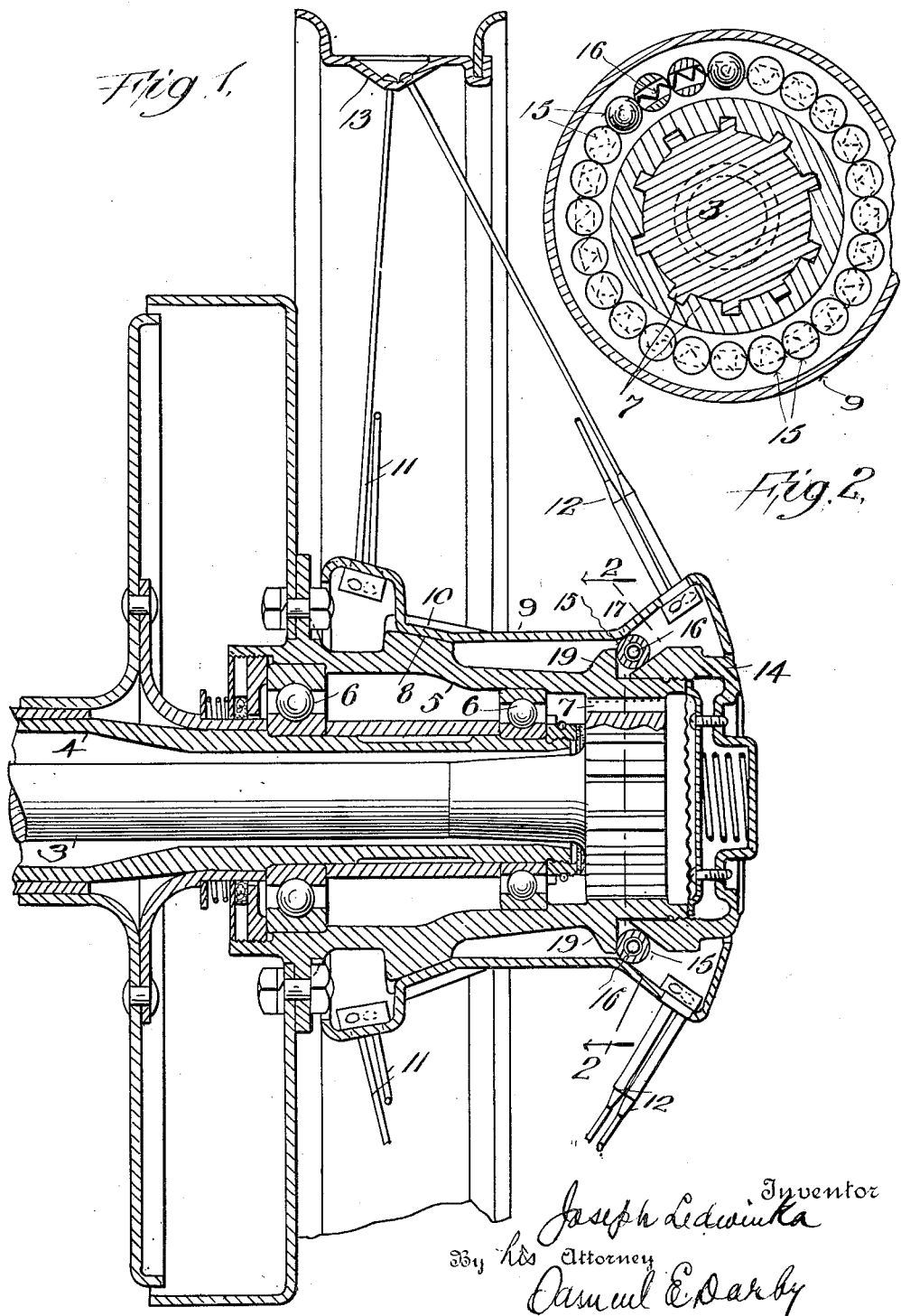

JOSEPH LEDWINKA, OF PHILADELPHIA, PENNSYLVANIA, ASSIGNOR, BY MESNE ASSIGNMENTS, TO BUDD WHEEL CORPORATION, OF PHILADELPHIA, PENNSYLVANIA, A CORPORATION OF VIRGINIA.

DETACHABLE WHEEL.

1,265,347.        Specification of Letters Patent.        Patented May 7, 1918.

Application filed July 19, 1916. Serial No. 110,198.

*To all whom it may concern:*

Be it known that I, JOSEPH LEDWINKA, a citizen of the United States, residing at Philadelphia, county of Philadelphia, State of Pennsylvania, have made a certain new and useful Invention in Detachable Wheels, of which the following is a specification.

This invention relates to wheels of the type wherein the wheel is made readily and easily detachable.

The object of the invention is to provide means which are simple in structure, economical to manufacture, and efficient in operation, for detachably clamping a wheel upon its supporting or carrying hub or axle.

The invention consists substantially in the construction, combination, location and relative arrangements of parts, all as will be more fully hereinafter set forth, as shown in the accompanying drawing, and finally pointed out in the appended claims.

In the drawing—

Figure 1 is a broken view in longitudinal section showing a wheel structure of the wire spoke type and detachable clamping means therefor embodying the principles of my invention.

Fig. 2 is a transverse section on the line 2, 2, Fig. 1, looking in the direction of the arrows.

The same part is designated by the same reference sign wherever it occurs throughout the several views.

I have shown my invention in detachable clamping means as applied to a wheel of the wire spoke type, but it will be obvious that I am not to be limited or restricted to this type of wheel.

In its essential characteristics my invention contemplates a wheel having a hub member adapted to be removably mounted upon a supporting hub or axle, and the employment of a series of balls, flexibly retained, against an engaging surface of the wheel hub, with a wedging member to expansibly force said balls into clamping engagement with said engaging surface to detachably clamp and secure the wheel hub and wheel in place.

In the form of structure shown as an embodiment of my invention the axle 3, extends through a sleeve 4, in the ordinary and usual manner of floating axle structures, though my invention is not to be limited or restricted to the floating axle type of structure.

A hub sleeve 5, is mounted to revolve, preferably upon ball bearings 6, and, in the case of a floating axle type of construction, is suitably geared to be driven from the axle, as, for example, through the intermeshing gears 7. The hub sleeve 5, is provided with an annular conical portion 8 to form a seat for the wheel hub sleeve 9, which is provided with a coöperating conical portion or surface 10. If desired, and where the wheel hub sleeve is intended to rotate with the axle hub sleeve 5, means are provided for locking the coöperating seating portions 8, 10, so as to rotate together, as, for example, by providing said seating surfaces with coöperating plane portions. In the case of a wire spoked wheel the spokes 11, 12, are suitably connected to the inner and outer ends of the wheel hub sleeve, and to the wheel rim 13.

The outer end of the axle hub sleeve 5 is suitably threaded to receive a clamp nut 14. Interposed between the axle hub sleeve 5 and the removable wheel hub sleeve 9 are a series of balls 15, preferably steel balls. These balls are flexibly retained upon the axle hub sleeve in any suitable manner, such, for example, as by means of a coiled spring ring 16, which is threaded through the balls as clearly shown, thereby forming an expansible circlet of connected balls. The wheel hub sleeve 9 is provided with a portion or surface 17 with which the balls 15, coöperatively engage. In the arrangement shown in the drawing the surface or portion 17 is inclined, thereby forming a clamping shoulder or abutment against which the balls bear, the inclination of said surface 17, being outwardly inclined in reverse direction to the inclination of the seating surfaces 8 and 10, so that when the circlet of balls 15 is expanded to force the balls against the surface 17 the wheel hub sleeve 9, or the portion 10 thereof, is forced firmly into its seating on the surface 8 of the axle hub sleeve 5, and held thereon. The ball circlet may be expanded, to effect the clamping engagement referred to, in any suitable or convenient manner. In the form shown as exemplifying my invention the cap nut 14 is provided with a beveled surface 18, at its inner end which enters the expansible ball circlet and hence, when said nut is screwed up the beveled surface 18 expands the circlet thereby forcing the balls outwardly into bearing contact against the surface 17, and, hence clamping the wheel hub sleeve in place. By unscrewing the cap 14 the expansible circlet of balls contracts, thereby releasing the balls from bearing contact against the surface 17, and hence permitting the sleeve 9, and with it the entire wheel to be withdrawn from the axle hub member 5.

If desired, or necessary, the axle hub sleeve 5, may be provided with an annular retaining shoulder 19 for the expansible ball circlet.

It will be seen that the clamping balls bear only at points instead of extended areas or surfaces, against the engaging surface 17. It will also be seen that the ball circlet may be applied to the sleeve 5, in any particular way with relation to each other as would be the case if wedge blocks are employed. In other words the circlet may be slipped over the end of the sleeve 5, without regard to whether one face or the other of the circlet is presented inwardly or outwardly, and whether one ball is in proper individual displacement with respect to an adjacent ball. This is a practical advantage in that the assembly of the structure is greatly facilitated and the assembling is made more certain. The structure is very simple, and inexpensive to manufacture thereby substantially reducing the cost.

The screw cap 14 may be retained in screwed on relation in any suitable or convenient manner but means for that purpose form no part of my present invention.

Having now set forth the objects and nature of my present invention, and a construction embodying the principles thereof, what I claim as new and useful and of my own invention, and desire to secure by Letters Patent, is:—

1. In a detachable wheel, an axle hub sleeve and a wheel hub sleeve, and means to detachably clamp said sleeves together including an expansible circlet of balls, and means to expand said circlet into clamping relation.

2. In a detachable wheel, an axle hub sleeve and a wheel hub sleeve, and means to detachably clamp said sleeves together including an expansible circlet of balls, and a screw cap having a beveled surface to enter said circlet and expand the same into clamping relation.

3. In a detachable wheel, an axle hub sleeve and a wheel hub sleeve, said sleeves mounted the one upon the other and having engaging seating surfaces, in combination with an expansible circlet of balls interposed between said sleeves, the outer sleeve having a bearing surface against which said balls act, and means to releasably expand said circlet for the balls thereof to engage said bearing surface.

4. In a detachable wheel, an axle hub sleeve and a wheel hub sleeve, said sleeves having coöperating annular seating surfaces, the wheel hub sleeve having a bearing surface, an annular expansible circlet of balls surrounding the axle hub sleeve, and means to expand said circlet to cause the balls thereof to engage said bearing surface.

5. In a detachable wheel, an axle hub sleeve and a wheel hub sleeve, said axle hub sleeve having an annular inclined seating surface adjacent its inner end and an annular retaining shoulder adjacent its outer end, said wheel hub sleeve having a coöperating annular inclined seating surface adjacent its inner end and reversely inclined bearing surface adjacent its outer end, an expansible circlet of balls encircling the axle hub sleeve and retained by the shoulder thereon, and means to expand said circlet to cause said balls to engage the bearing surface on said wheel hub sleeve.

In testimony whereof I have hereunto set my hand in the presence of the subscribing witnesses, on this 10th day of July A. D., 1916.

JOSEPH LEDWINKA.

Witnesses:
L. R. HILYARD,
A. H. BUXBAUM.